United States Patent [19]

Maucher

[11] Patent Number: 4,895,237
[45] Date of Patent: Jan. 23, 1990

[54] COMPONENT FOR USE IN THE POWER TRAIN OF A MOTOR VEHICLE

[75] Inventor: Paul Maucher, Sasbach, Fed. Rep. of Germany

[73] Assignee: Luk Lamellen und Kupplungsbau GmbH, Bühl, Fed. Rep. of Germany

[21] Appl. No.: 166,622

[22] Filed: Mar. 11, 1988

[30] Foreign Application Priority Data

Mar. 13, 1987 [DE] Fed. Rep. of Germany ....... 3708107

[51] Int. Cl.$^4$ .............................................. F16D 3/14
[52] U.S. Cl. .............................. 192/106.2; 192/70.17; 192/107 C; 464/63
[58] Field of Search ............... 192/70.17, 106.1, 106.2, 192/107 C; 464/63

[56] References Cited

U.S. PATENT DOCUMENTS

| | | | |
|---|---|---|---|
| 4,396,103 | 8/1983 | Loizeau | 192/106.2 |
| 4,446,955 | 5/1984 | Lech, Jr. | 192/106.2 |
| 4,562,913 | 1/1986 | Cucinotta et al. | 192/70.17 |
| 4,563,165 | 1/1986 | Takeuchi | 192/106.2 |

FOREIGN PATENT DOCUMENTS 2040398 8/1980 United Kingdom ............. 192/106.2

*Primary Examiner*—Rodney H. Bonck
*Assistant Examiner*—David Testardi
*Attorney, Agent, or Firm*—Peter K. Kontler

[57] ABSTRACT

The clutch plate of a friction clutch in the power train of a motor vehicle has a hub which can transmit torque to the input shaft of a variable-speed transmission, a carrier of two annuli of friction linings which are clamped between the flywheel and the pressure plate of the engaged friction clutch, a primary damper which damps vibrations of the clutch plate when the engine which drives the flywheel is idling, and a main damper which is interposed between the primary damper and the hub. The primary damper has an input element which is clamped between the friction linings when the clutch is engaged, and such input element can turn relative to the carrier during an advantaged stage of rotation of the carrier relative to the hub from a neutral position in the traction direction. The primary damper further has coil springs which operate between the input element and the hub, and the main damper has two sets of additional coil springs. One set of additional coil springs is active to store energy when the torque of the engine exceeds the idling torque, and the other set of additional coil springs is active when the angular displacement of the carrier relative to the hub exceeds the advanced stage. The primary damper is effective in response to engagement of the friction clutch only during conditions of relatively small torque transmission. When the transmission of torque exceeds a predetermined value, operation of the primary damper is disabled.

28 Claims, 5 Drawing Sheets

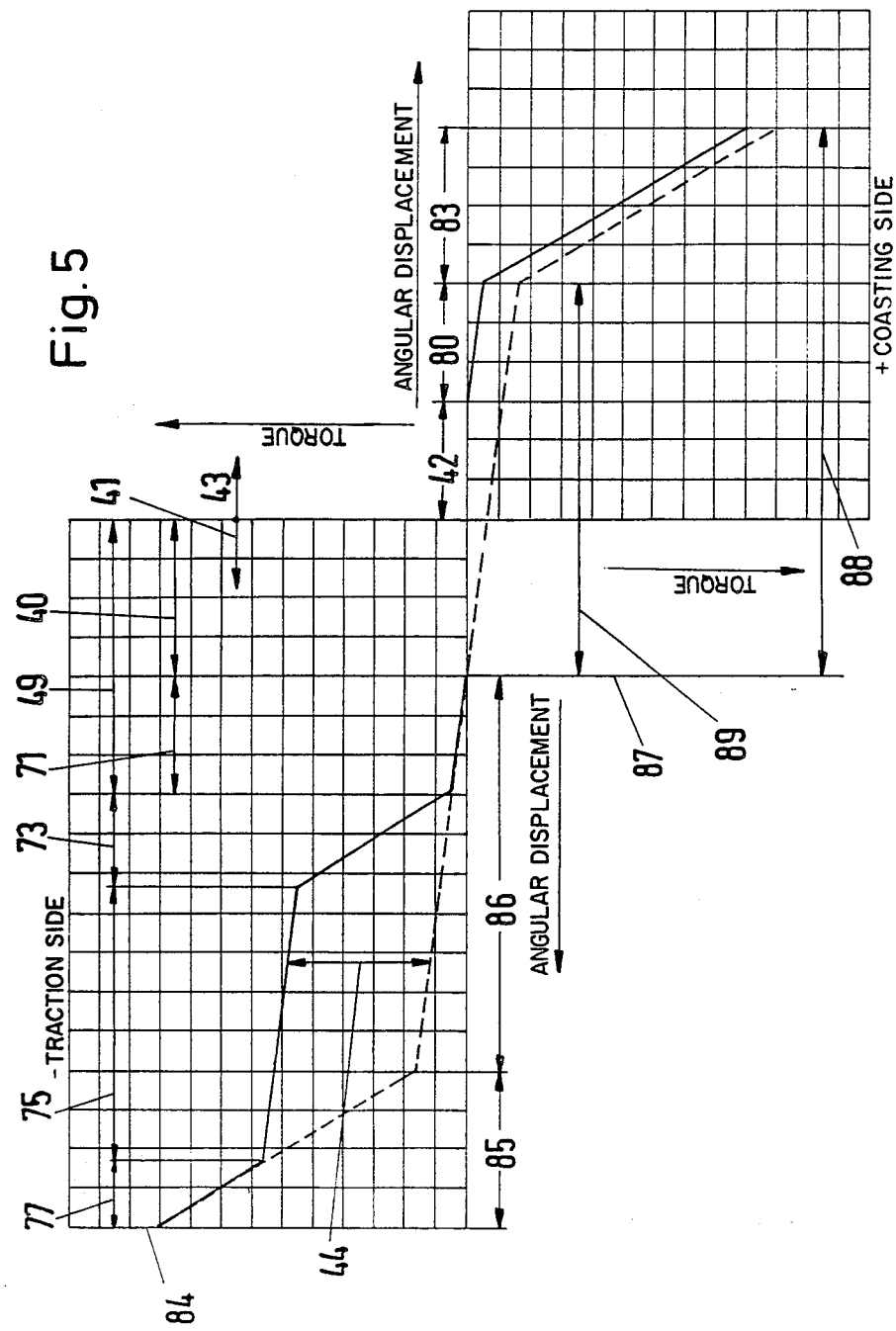

COMPONENT FOR USE IN THE POWER TRAIN OF A MOTOR VEHICLE

BACKGROUND OF THE INVENTION

The invention relates to improvements in components of power trains in motor vehicles, such as clutch plates in friction clutches or similar aggregates or systems which transmit torque between the engine and the variable-speed transmission of an automobile, truck or another engine-driven conveyance. More particularly, the invention relates to improvements in components of the type wherein a carrier of friction linings can be caused to transmit torque to a hub (and vice versa), and the carrier and hub can turn relative to each other in at least one direction against the opposition of several energy storing units including a first or primary unit which can oppose angular movements of the carrier and the hub relative to each other independently of the other unit or units while the carrier moves away from a starting or neutral position with reference to the hub or vice versa.

In accordance with a presently known proposal, the energy storing elements of the primary unit are caused to store energy during idling of the engine but are bypassed as the RPM of the engine increases beyond the idling speed. For example, the energy storing elements of the primary energy storing unit can be bypassed by blocking or locking members which are acted upon by centrifugal force and become effective when the RPM rises above the idling speed. This is believed to enhance the damping ability and the ability of the power train to counteract the fluctuations of load, especially to suppress vibrations which develop when the engine is operated under load. Since the space under the hood and elsewhere in a motor vehicle is at a premium, the aforediscussed means for bypassing the idling damper or dampers must necessarily rely on compact blocking or locking members whose mass is small so that such members are incapable of reacting with the required degree of reliability when the centrifugal force increases or decreases, especially when the RPM of the engine is relatively low. This creates problems because such compact members are apt to bypass the primary damper or dampers at an inopportune time or to fail to deactivate or sideline the primary damper or dampers when the action of such damper or dampers is unnecessary or undesirable. Furthermore, the accuracy of blocking or bypassing devices which rely on centrifugal force is insufficient on the additional ground that frictional hysteresis develops between the moving parts. Such hysteresis opposes the blocking or locking action of blocking members which are influenced by centrifugal force when the RPM of the engine increases, and it opposes the unblocking of the primary damper or dampers when the RPM of the engine decreases. All in all, it is not possible to select the exact RPM for the activation or bypassing of the primary damper or dampers with a degree of predictability which is desirable and necessary in the power train of a motor vehicle. Therefore, the primary damper or dampers are blocked or bypassed at a speed which is well above the idling RPM.

OBJECTS AND SUMMARY OF THE INVENTION

An object of the invention is to provide a component, such as the clutch plate or clutch disc of a friction clutch in the power train of a motor vehicle, wherein the primary damper or dampers can be activated and bypassed with a much higher degree of predictability than in presently known power trains.

Another object of the invention is to provide a component wherein the activation or bypassing of the primary damper or dampers need not rely on centrifugal force.

A further object of the invention is to provide a component wherein the primary damper or dampers can be bypassed within the idling RPM range.

An additional object of the invention is to provide a component wherein the primary or idling damper or dampers can be deactivated as soon as and whenever their functioning would adversely influence the operation of the power train.

Still another object of the invention is to provide a relatively simple, reliable, long-lasting, compact and inexpensive clutch plate which can be employed in existing friction clutches as a superior substitute for conventional clutch plates.

A further object of the invention is to provide a friction clutch which embodies the above outlined component, and to provide a power train which employs a friction clutch embodying the above outlined component.

The invention is embodied in a component of a power train in a motor vehicle, particularly in a clutch plate or clutch disc which is equipped with damper means between its input and output means and can be installed in an aggregate, particularly in an engageable and disengageable friction clutch. The improved component comprises a rotary hub and a carrier of two annular friction linings which is coaxial with the hub. The carrier and the hub are rotatable relative to each other in at least one direction (e.g., in the traction direction of the power train when the engine transmits torque to the wheels through the medium of the engaged friction clutch and a variable-speed transmission) from a neutral or starting position. The component further comprises a first or primary damper including first energy storing means (e.g., a set of two or more first coil springs) constituting the only means for yieldably opposing with a first force a first stage of rotation of the hub and the carrier relative to each other in the at least one direction, and a second or main damper having at least one additional energy storing means (particularly first additional energy storing means including one or more coil springs and second additional energy storing means including one or more coil springs) arranged to yieldably oppose an additional stage of rotation of the hub and carrier relative to each other in the at least one direction in response to engagement of the friction clutch and in response to the application of a second force which is greater than the first force only as long as the friction clutch remains engaged so that the first energy storing means again constitutes the only means for opposing rotation of the hub and the carrier relative to each other in the at least one direction in response to disengagement of the friction clutch. Thus, the additional energy storing means is operative only during the additional stage of rotation of the hub and carrier relative to each other in the at least one direction.

The primary damper further comprises an input element having portions (e.g., in the form of radially outwardly extending arms) which are disposed between the two annuli of friction linings and are clamped between the friction linings in engaged condition of the friction clutch. The input element and the hub are rotatable relative to each other against the opposition of the first energy storing means, i.e., the first energy storing means stores energy or stores additional energy in response to rotation of the carrier and/or hub on the one hand, and input element on the other hand, relative to each other. The damper means of the component can comprise additional energy storing means (e.g., in the form of one or more coil springs) serving to oppose rotation of the carrier and the input element relative to each other. The additional energy storing means is preferably operative to maintain the carrier and the input element in a predetermined angular position relative to each other in disengaged condition of the friction clutch. The input element can constitute or resemble a disc whose arms extend between the two annuli of friction linings on the carrier and are or can be provided with friction pads which are flanked by and are clamped between the friction linings in engaged condition of the friction clutch. The latter has friction surfaces which are in frictional engagement with the friction linings in engaged condition of the friction clutch, and the coefficient of friction between the arms of the input element (i.e., friction pads) on the one hand and the friction linings on the other hand is preferably smaller than the coefficient of friction between the friction linings on the one hand and the friction surfaces of the friction clutch on the other hand.

The primary damper has a predetermined maximum moment of resistance, and the moment of friction between the input element and friction linings in engaged condition of the friction clutch is preferably greater than the maximum moment of resistance of the primary damper.

As mentioned above, the main damper can include a plurality of additional energy storing means including a first additional energy storing means which stores energy when the first stage of rotation of the carrier and hub relative to each other in the at least one direction is completed. The moment of friction between the input element of the primary damper and the friction linings on the carrier in engaged condition of the friction clutch is preferably greater than the maximum moment of resistance of the first additional energy storing means.

The input element of the primary damper preferably slips relative to the friction linings in engaged condition of the friction clutch during an advanced portion of the additional stage of rotation of the carrier and hub relative to each other in the at least one direction. The main damper can comprise first and second additional energy storing means, and the first additional energy storing means can serve to store energy during the initial portion of the additional stage of rotation of the carrier and hub relative to each other. The second additional energy storing means can operate in parallel with the first energy storing means (of the primary damper) to store energy during that portion of the additional stage which follows the aforementioned advanced portion of the additional stage. One of the first and second additional energy storing means (particularly the first additional energy storing means) can be designed to store energy during the additional stage within a smaller angle prior to and within a larger angle following the slippage of input element and carrier relative to each other within the aforementioned advanced portion of the additional stage (such advanced portion preferably follows a first portion (during which only the first additional energy storing means stores energy, preferably jointly with the first energy storing means) and is followed by a third portion during which all of the energy storing means can store energy.

The input element and the carrier can be provided with registering windows for at least one energy storing element of the additional energy storing means. Such at least one energy storing element stores energy within that predetermined advanced portion of the additional stage of rotation of the carrier and hub relative to each other when the friction linings slip relative to the input element of the primary damper. At least one further energy storing element of the additional energy storing means can be arranged to store energy as a result of angular movement of the input element and the carrier relative to each other in response to engagement of the input element with the further energy storing element of the additional energy storing means prior to engagement of the further energy storing element with the carrier of friction linings.

The moment of resistance of one (particularly the at least one) energy storing element of the additional energy storing means can fluctuate between a maximum and a minimum value within a predetermined portion of the additional stage of rotation of the carrier and hub relative to each other, namely when the input element of the primary damper slips relative to the carrier and its friction linings in engaged condition of the friction clutch.

The output means of the main damper preferably further comprises at least one wall which is affixed to the hub, most preferably two walls which are spaced apart from each other in the axial direction of the hub. At least one of the walls and the input element of the primary damper have windows for the first energy storing means. Additional windows are provided in the walls, in the input element and in the carrier for the additional energy storing means. As mentioned above, the additional energy storing means can comprise several (particularly two) groups, sets or arrays of energy storing elements in the windows of the walls, input element and carrier. The input element of the primary damper and the carrier of friction linings are preferably disposed between the walls of the output means of the main damper. A disc-shaped member can be affixed to the hub between the walls to constitute another part of the output means of the main damper. The disc-shaped member is preferably disposed between the radially innermost portions of the carrier of friction linings and input element of the primary damper. The disc-shaped member can be provided with one or more windows for the first energy storing means.

The first energy storing means is preferably nearer to the hub (as considered radially of the hub) than the additional energy storing means.

The windows which are provided in the input element of the primary damper for the first additional energy storing means preferably have the same length (in the circumferential direction of the hub) as the windows which are provided in the carrier to receive the first additional energy storing means.

The windows which are provided in the carrier for the additional energy storing means preferably have the same length (in the circumferential direction of the hub) as the windows which are provided in the input element of the primary damper to receive the additional energy storing means. The windows which are provided in the walls of output means of the main damper to receive the additional energy storing means are preferably shorter than the windows which are provided in the carrier and input element to receive the additional energy storing means.

The input element and carrier have substantially radially extending edge faces which are provided in the windows for the additional energy storing means in register with each other in the axial direction of the hub in disengaged condition of the friction clutch. On the other hand, all radially extending edge faces in the windows of the aforementioned walls for the additional energy storing means are preferably out of register with the radially extending edge faces of windows provided for the additional energy storing means in the carrier and in the input element (as seen in the circumferential direction of the hub) when the friction clutch is disengaged.

The novel features which are considered as characteristic of the invention are set forth in particular in the appended claims. The improved component itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 5 is a diagram showing the theoretical characteristic torsion damping curve of the clutch plate by disregarding the hysteresis which is generated by the friction generating elements of the clutch plate.

DESCRIPTION OF THE PREFERRED EMBODIMENTS

Figure 1:
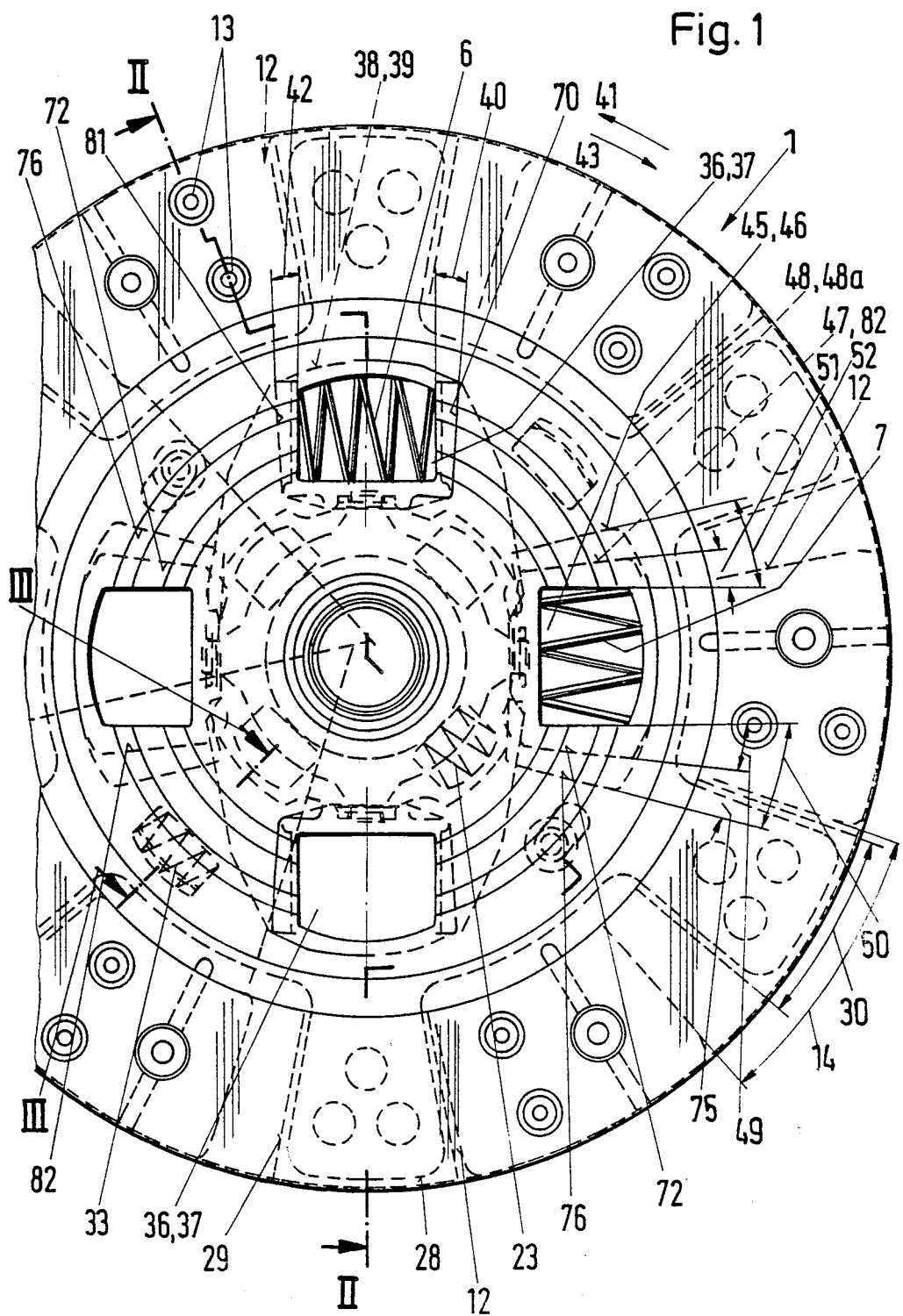
FIG. 1 is a fragmentary front elevational view of a component which constitutes a clutch plate and embodies the present invention.

FIGS. 1 to 4 show a component 1 of a power train between the engine and the wheels of a motor vehicle. The component 1 is a clutch plate or clutch disc which has an output element 2 and an input element 3 with friction linings 4, 5. Energy storing elements 6, 7 in the form of coil springs are installed between the input element 3 and the output element 2 to yieldably oppose rotation of such elements relative to each other about a common axis.

The output element 2 comprises a hub 8 and two axially spaced-apart disc-shaped walls 9, 10 which surround and share the angular movements of the hub 8. The input element 3 comprises a disc-shaped carrier 11 which is disposed between the walls 9, 10 (as seen in the axial direction of the hub 8).

The radially outermost portion of the carrier 11 supports axially elastic segments 12 which support the friction lining 4. Rivets 13 are provided as a means for fixedly securing the segments 12 to the carrier 11. The other friction lining 5 is secured to that side of the carrier 11 which faces away from the segments 12. As can be seen in FIG. 1, the segments 12 form an annulus of equidistant segments (as seen in the circumferential direction of the hub 8), and the spaces which are provided between neighboring segments 12 have a width 14 (as seen in the circumferential direction of the hub 8). The character 15 (FIG. 2) denotes the extent of axial movability of friction linings 4 relative to the friction linings 5.

The clutch plate 1 further comprises a primary damper or idling damper 17 including a disc shaped member 16 which constitutes the input element of the damper and is disposed between the carrier 11 and the wall 9. The output element of the damper 17 includes a second disc-shaped member 18 which is disposed between the radially innermost portions of the carrier 11 and input element 16 and is non-rotatably secured to the hub 8. The output element of the damper 17 further includes the wall 9. The parts 18, 9 and 16 are respectively provided with axially aligned windows 20, 21 and 22 (FIG. 4) for energy storing elements 23 of the damper 17. Each of these energy storing elements is a coil spring.

The median portions of the carrier 11 and input element 16 of the primary or idling damper 17 (as seen in the radial direction of the clutch plate 1) are connected to each other by rivets 24 each of which is anchored in the carrier 11 (see particularly FIG. 4) and has a shank 25 extending through a slot 26 of the input element 16. The head 27 of each rivet 24 serves to hold the input element 16 and the carrier 11 against movement away from each other in the axial direction of the clutch plate 1. Each slot 26 of the input element 16 is elongated in the circumferential direction of the hub 8. Distancing members in the form of washers 19 made of suitable friction generating or friction reducing material are interposed between the input element 16 and carrier 11, and each of these washers 19 surrounds the shank 25 of the respective rivet 24. The parts 11 and 16 are cupped or dished in the region of the disc-shaped member 18 so that they form a relatively shallow annular compartment in the region surrounding the hub 8, the compartment loosely receiving the member 18.

The input element 16 of the damper 17 has radial projections in the form of arms 28 extending radially outwardly into the spaces 15 between the friction linings 4, 5. Each arm 28 is coated, at both sides, with friction pads 29. The combined thickness of an arm 28 and the friction pads 29 thereon is less than the width of a space 15 (as seen in the axial direction of the clutch plate 1) in unstressed condition of the friction linings 4, 5. The arms 28 and their friction pads 29 extend along arcs 30 (note FIG. 1) which are smaller than the width of the spaces 14 between neighboring segments 12 on the carrier 11. Thus, the arms 28 and their friction pads 29 have some freedom of movement with reference to the carrier 11 in the circumferential direction of the hub 8. This will be explained in greater detail hereinafter with reference to FIG. 5.

Figure 3:
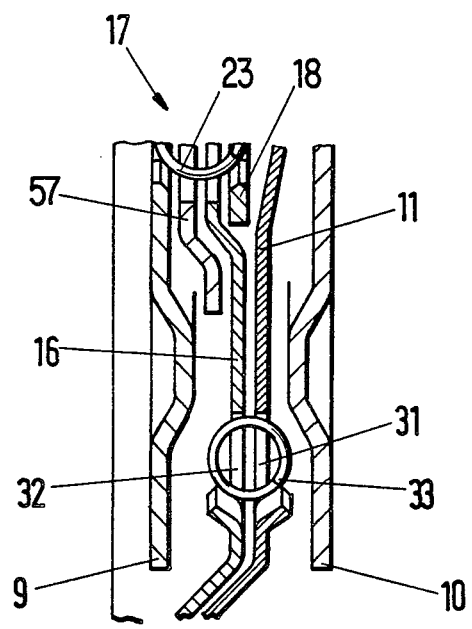
FIG. 3 is an enlarged fragmentary sectional view as seen in the direction of arrows from the line III—III of FIG. 1.

FIG. 3 shows that the carrier 11 is formed with windows 31 in register with windows 32 of the input element 16 and receiving energy storing elements 33 in the form of coil springs. The clutch plate 1 comprises two coil springs 33 which are disposed diametrically opposite each other (see FIG. 1) and each of which is disposed between a pair of coil springs 6, 7. The windows for the coil springs 6 and 7 are dimensioned in such a way that the coil springs 33 are free to maintain the carrier 11 and the input element 16 in, or to force the parts 11, 16 to, predetermined starting or neutral positions when the friction pads 29 on the arms 28 of the input element 16 are not clamped between the friction linings 4, 5 and/or between the parts which support the friction linings.

The coil springs 6 form part of the main damper of the clutch plate 1 and constitute the first energy storing unit or stage of the main damper. Each of these coil springs is received in two identically dimensioned and accurately registering windows 36, 37 which are respectively provided in the walls 9, 10 of the output element 2, and in two identically dimensioned and accurately registering windows 38, 39 which are respectively provided in the carrier 11 and input element 16. The length of the windows 38, 39 in the circumferential direction of the hub 8 exceeds the length of the windows 36, 37; therefore, when the carrier 11 and the walls 9, 10 assume the starting or neutral positions of FIG. 1 (in which no transfer of torque takes place between the carrier 11 and the hub 8), the end convolutions of the coil springs 6 are spaced apart from the radially extending edge faces in the windows 38, 39 of the carrier 11 and input element 16. The angles between the trailing edge faces 70 in the windows 38, 39 and the adjacent end convolutions of the coil springs 6 (as seen in the direction of arrow 41) are shown at 40, and the angles between the leading radially extending edge faces 81 in the windows 38, 39 and the adjacent end convolutions of the coil springs 6 are, shown at 42. The radially extending edge faces 70 strike the adjacent end convolutions of the respective coil springs 6 when the hub 8 is idle and the carrier 11 turns in the forward or traction direction which is indicated by the arrow 41 (namely when the friction clutch embodying the clutch plate 1 is engaged and the engine rotates the carrier 11 in the direction of arrow 41). The edge faces 81 strike against the adjacent end convolutions of the respective coil springs 6 when the vehicle embodying the friction clutch including the clutch plate 1 is coasting so that the hub 8 and the walls 9, 10 rotate with reference to the carrier 11 in the direction which is indicated by the arrow 43.

The coil springs 7 constitute the second energy storing unit or stage of the main damper and are received in identically dimensioned and accurately registering windows 45, 46 in the walls 9, 10 as well as in identically dimensioned but non-registering windows 47, 48 in the carrier 11 and input element 16. The length of the windows 47, 48 is greater than that of the windows 45, 46 (as seen in the circumferential direction of the clutch plate 1), and the windows 47, 48 are angularly offset with reference to each other. All this can be readily seen in FIG. 1. As mentioned above, the length of each window 47 matches that of a window 48; however, the radially extending leading and trailing edge faces in the window 47 are angularly offset with reference to the radially extending leading and trailing edge faces in the window 48.

The trailing radially extending edge face 72 in each window 48 for the corresponding coil spring 7 is spaced apart from the nearest convolution of the spring 7 at an angle 49, i.e., the input element 16 must turn in the direction of arrow 41 through the angle 49 before the edge faces 72 reach the rearmost convolutions of the respective coil springs 7. If the carrier 11 turns with reference to the walls 9 and 10 in the direction of arrow 41, the rear or trailing edge faces 76 in the windows 47 must cover a distance corresponding to the angle 50 in order to engage the nearest end convolutions of the coil springs 7. The angles 50 are greater than the angles 40.

The situation is different if the input element 16 and the carrier 11 are caused to rotate in the direction of arrow 43, i.e., the angle 51 between the trailing edge face 82 in a window 47 and the nearest convolution of the corresponding coil spring 7 is smaller than the angle 52 between the trailing edge face 48a in a window 48 and the nearest convolution of the respective coil spring 7.

Figure 4:
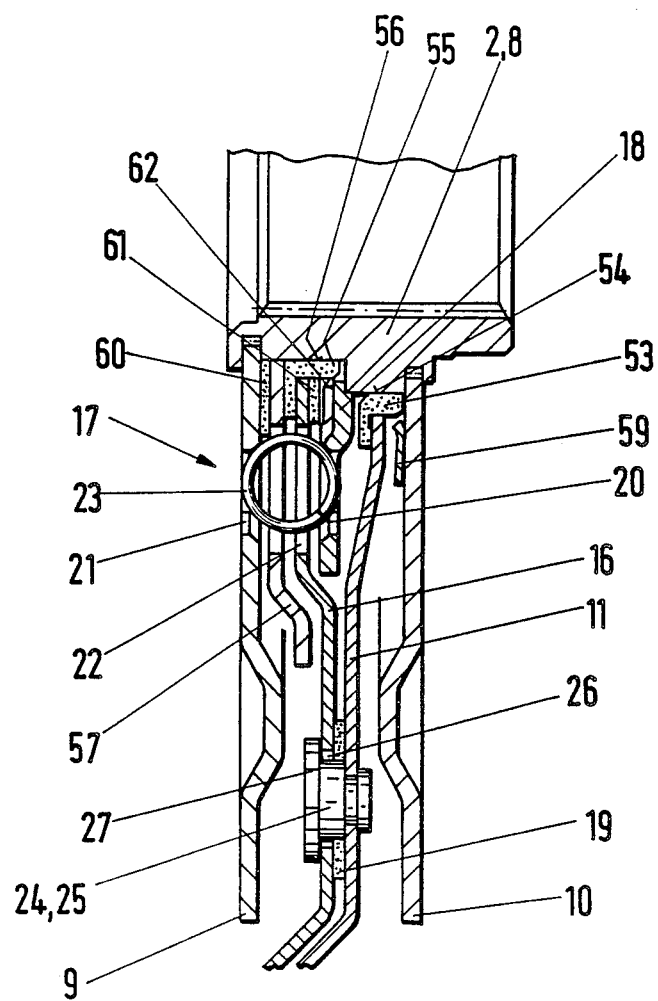
FIG. 4 is enlarged view of a detail within the phantom-line circle X in FIG. 2.

FIG. 4 shows that the carrier 11 surrounds a ring 53 which has an L-shaped cross-sectional outline and whose cylindrical portion surrounds a cylindrical peripheral surface 54 of the hub 8. The ring 53 can be said to constitute a friction bearing for the carrier 11. The input element 16 of the primary or idling damper 17 surrounds a second ring 55 which has an L-shaped cross-sectional outline and whose cylindrical portion surrounds a cylindrical peripheral surface 56 of the hub 8. The ring 55 can be said to constitute a friction bearing for the input element 16 of the primary or idling damper 17. A friction disc 57 is installed between the input element 16 and the wall 9; this friction disc has radially extending arms which engage the coil springs 6 of the main damper. The friction disc 57 is further provided with axially extending arms or protuberances 58 (FIG. 2) which extend with freedom of angular movement through slots or recesses in the carrier 11 and input element 16. A diaphragm spring 59 reacts against the wall 10 and its radially outermost portions bear against the tips of the axial protuberances 58, of the friction disc 57 so that the latter is biased against a friction ring 60 (FIG. 4) which is interposed between the friction disc 57 and the wall 9. A further friction ring 61 is interposed between the disc-shaped member 18 (which cannot turn on the hub 8) and the output element 16. The friction ring 61 is biased against the input element 16 by an undulate annular spring 62 which reacts against the adjacent radially innermost portion of the disc-shaped member 18. The undulate spring 62 ensures that the input element 16 of the primary damper 17 is clamped between the radially extending portion of the ring 55 and the friction ring 61.

Figure 2:
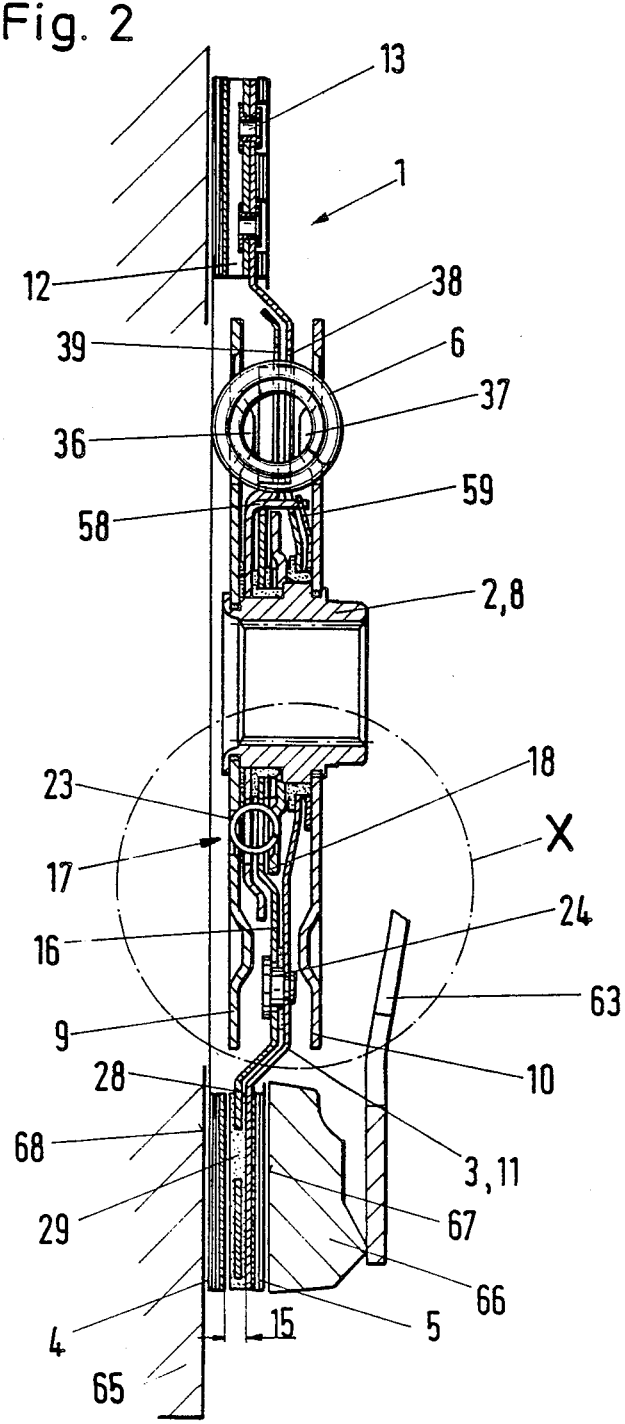
FIG. 2 is a sectional view as seen in the direction of arrows from the line II—II of FIG. 1.

FIG. 2 shows certain additional parts of a friction clutch which includes the clutch plate 1. Such additional parts include a flywheel 65 which is secured to the crankshaft of an internal combustion engine (not specifically shown) and has a friction surface 68 adjacent the friction lining 4, an axially movable pressure plate 66 having a friction surface 67 adjacent the friction lining 5, and a diaphragm spring 63 which serves to bias the clutch plate 66 axially toward the flywheel 65 so that the friction linings 4, 5 on the carrier 11 are clamped between the friction surfaces 68 and 67 as soon as and as long as the friction clutch is engaged. The hub 8 has axially parallel internal splines so that it can be slipped onto the input shaft of a variable-speed transmission in the motor vehicle. The friction clutch is disengaged by causing the radially inwardly extending prongs of the diaphragm spring 63 to move in a direction to the left (as seen in FIG. 2) so that the spring 63 is tilted with reference to its seats on the cover or housing (not shown) of the friction clutch and allows the pressure plate 66 to move axially in a direction away from the flywheel 65. This enables the flywheel 65 to turn relative to the clutch plate 1 and hence relative to the input shaft of the variable-speed transmission. FIG. 2 shows the pressure plate 66 in an axial position which the pressure plate can assume when the friction clutch is disengaged, i.e., when the flywheel 65 cannot transmit torque to the hub 8 and hence to the input shaft of the transmission.

The mode of operation of the component which includes or constitutes the clutch plate 1, and of the friction clutch including the clutch plate 1, will be described with reference to FIGS. 1–4 as well as with reference to the diagram of FIG. 5 wherein the angular displacements of the input and output elements 3, 2 of the clutch plate 1 are measured along the abscissa and the torque is measured along the ordinate.

As mentioned above, FIG. 1 shows the input and output elements 3, 2 of the clutch plate 1 in their neutral or starting positions. These elements assume such starting positions when the friction clutch is disengaged so that the flywheel 65 (which is assumed to be driven by the engine) cannot transmit torque to the carrier 11 and to its friction linings 4 and 5. If the driver of the motor vehicle then decides to engage the friction clutch by causing or permitting the radially outermost portion of the diaphragm spring 63 of FIG. 1 to push the pressure plate 66 toward the flywheel 65, the flywheel 65 begins to transmit torque to the carrier 11 (the pressure plate 66 rotates with the flywheel 65) so that the carrier 11 begins to turn relative to the output element 2 of the clutch plate 1. For the sake of simplicity, it is now assumed that the output element 2 (including the hub 8 and the walls 9, 10) of the clutch plate 1 is held against rotation, i.e., that activation or engagement of the friction clutch results in turning of the carrier 11 and its friction linings 4, 5 relative to the hub 8.

It is desirable and advantageous to ensure that the friction coefficient and the slip torque between the friction pads 29 on the arms 28 of the input element 16 and the friction linings 4, 5 on the carrier 11 be less than the coefficient of friction and slip torque between the friction linings 4, 5 and the adjacent friction surfaces 68, 67 of the flywheel 65 and pressure plate 66, respectively.

When the friction clutch is engaged, the diaphragm spring 63 maintains the pressure plate 66 in engagement with the friction lining 5 and simultaneously urges the friction lining 4 against the surface 68 of the flywheel 65 so that the carrier 11 simultaneously receives torque from the flywheel 65 and from the pressure plate 66. This results in deformation of the segments 12 in axial direction of the clutch plate 1 so that the pads 29 on the arms 28 of the input element 16 of the primary damper 17 are clamped between the friction linings 4, 5 and between the parts on which such friction linings are mounted. When the flywheel 65 transmits torque in the forward or traction direction (arrow 41 in FIG. 1), the carrier 11 turns in the same direction, together with the input element 16 of the primary or idling damper 17, so that the coil springs 23 of the damper 17 begin to store energy (it will be recalled that the output element 2 of the damper 17 is assumed to be held against rotation). The coil springs 23 continue to store energy (as the input element 16 turns in the direction of arrow 41) while the input element 16 covers the angle 40 (see also FIG. 5); at such time, the trailing edge faces 70 in the windows 38, 39 of the carrier 11 and input element 16 come into engagement with the nearest convolutions of the respective coil springs 6 at the start of the second stage of angular movement of the carrier 11 and input element 16 relative to the output element 2 of the clutch plate 1. The trailing edge faces 70 then begin to stress the coil springs 6 so that these springs store energy while the carrier 11 and the input element 16 continue to turn in the direction of arrow 41 and while the output element 2 remains idle. In other words, the first energy storing unit of the main damper including the coil springs 6 and 7 begins to store energy after the carrier 11 has turned through the angle 40 and the first energy storing unit (springs 6) then stores energy jointly with the coil springs 23 of the primary damper 17 while the carrier 11 turns through the angle 71 (FIG. 5). The coil springs 23 and 6 continue to store energy while the carrier 11 covers the angle 71; the next part of the second or additional stage of operation of the damper means including the primary damper 17 and the main damper including the coil springs 6 and 7 begins when the rear or trailing edge faces 72 in the windows 48 of the input element 16 (which turns with the carrier 11) reach the nearest convolutions of the respective coil springs 7 which constitute the second energy storing unit of the main damper. The sum of angles covered by the carrier 11 and input element 16 in order to move the carrier 11 from the neutral position to the position in which the trailing edge faces 72 engage the coil springs 7 equals the angle 49 which is shown in FIGS. 1 and 5.

As the carrier 11 continues to turn in the direction of arrow 41 beyond the angle 49, the edge faces 72 cause the coil springs 7 to store energy jointly with the coil springs 23 (primary damper 17) and coil springs 6 (first energy storing unit of the main damper). This energy storing step is completed when the carrier 11 covers an additional angle 73; at such time, the input element 16 is acted upon by the compressed coil springs 23 and 7 with a force which exceeds the friction or slip torque between the friction pads 29 on the arms 28 of the input element 16 on the one hand and the friction linings 4, 5 and the parts carrying these friction linings on the other hand. While the carrier 11 covers the angle 73, the springs 7 store energy jointly with the springs 6 and 23. If the angular displacement of the carrier 11 in the direction of arrow 41 (with reference to the output element 2) continues beyond the combined angle 40+71+73, the carrier 11 begins to turn relative to the input element 16 of the primary damper 17, i.e., the input element 16 ceases to turn relative to the walls 9, 10. In other words, the carrier 11 then turns with reference to the input element 16 even though the pads 29 on the arms 28 of the input element 16 are still clamped between the friction linings 4 and 5. Such rotation of the carrier 11 relative to the input element 16 takes place while the carrier 11 turns through an angle 75, i.e., beyond the angle 40+71+73 or 49+73. When the carrier 11 has completed its angular movement through the angle 49+73+51, the rear or trailing edge faces 76 in the windows 47 of the carrier 11 reach the nearest convolutions of the respective coil springs 7. FIG. 1 shows that the angle 75 corresponds to the angle between the edge faces 72 and 76 in the respective windows 48 and 47 of the input element 16 and carrier 11. The coil springs 6 of the main damper continue to store energy when the carrier 11 continues to turn (in the direction of arrow 41) beyond the angle 49+73+75. The character 44 denotes in FIG. 5 frictional hysteresis which develops while the carrier 11 covers the angle 75 because the friction linings 4, 5 then turn relative to the arms 28 and friction pads 29 of the carrier 11. Moreover, the coil springs 33 then store energy because the carrier 11 turns relative to the input element 16 of the primary damper 17. Thus, the coil springs 33 operate in parallel with the coil springs 6 while the carrier 11 covers the angle 75. The coil springs 7 continue to store energy when the carrier 11 proceeds to turn beyond the angle 75 because the rear edge faces 76 in the windows 47 of the carrier 11 move in the direction of arrow 41. Such additional compression of the coil springs 7 is terminated when the carrier 11 completes an angle 49+71+75+77. Compression of coil springs 7 is terminated (at 84 in FIG. 5) because the coil springs 7 and/or 6 then act not unlike solid bodies or blocks (i.e., the neighboring convolutions of springs 7 and/or 6 abut each other and prevent any additional shortening of the springs). However, in addition to relying on such mode of terminating the compression of springs 6, 7 in the main damper, the improved clutch plate 1 can further comprise means for positively holding the carrier 11 against any further angular movement from the starting or neutral position of FIG. 1, e.g., by providing the wall 9 and/or 10 with one or more stops which engage the carrier 11 when the latter has completed the angle 49+73+75+77.

The input element 16 of the primary damper 17 turns with the carrier 11 while the latter covers the angle 77, i.e., the coil springs 23 between the input element 16 and the parts 9, 18 then store energy because they undergo progressive compressing action as a result of turning of the input element 16 relative to the wall 9 and member 18 (the parts 9 and 18 are non-rotatably secured to the hub 8 which is at a standstill).

When the friction clutch including the clutch plate 1 is engaged and the carrier 11 is caused to turn from the neutral position of FIG. 1 in the direction of arrow 43 (with reference to the stationary output element 2 of the clutch plate), the coil springs 23 of the primary damper 17 are caused to store energy during the initial stage of such angular movement of the carrier 11, (note the angle 42 in FIGS. 1 and 5). When the angle 42 is exceeded, the coil springs 6 of the main damper store energy jointly with the coil springs 23 of the primary damper 17 while the carrier 11 covers the angle 80. This is due to the fact that, when the carrier 11 covers the angle 42, the edge faces 81 in the windows 38, 39 of the carrier 11 and input element 16 engage the adjacent convolutions of the respective coil springs 6.

When the carrier 11 completes the angle 80, the edge faces 82 in the windows 47 of the carrier 11 engage the adjacent convolutions of the coil springs 7 so that the coil springs 7 are caused to store energy jointly (in parallel) with the coil springs 6 and 23 if the carrier 11 continues to turn beyond the combined angle 42+80 (in the direction of arrow 43). The coil springs 23, 6 and 7 abut the edge faces in the corresponding windows of the parts of output element 2 (which is at a standstill) while the carrier 11 turns clockwise (as seen in FIG. 1) from the neutral position through successive angles 42, 80 and 83. The coil springs 7 store energy while the carrier 11 turns through the angle 83, the coil springs 6 store energy while the carrier 11 turns through the angle 80+83, and the coil springs 23 store energy while the carrier 11 turns through the angle 42+80+83.

If the carrier 11 begins to turn in the direction of arrow 43 (back toward the neutral position of FIG. 1) after is has completed an angle 49+73+75+77 in the direction of arrow 41 (note the line 84 in FIG. 5), the coil springs 23, 6 and 7 jointly dissipate energy while the carrier 11 covers the angle 85. The angle 85 equals the sum of the angles 73 and 75 (covered by the carrier 11 during turning in the direction of arrow 41 from the neutral position of FIG. 1 toward the end position (line 84) of FIG. 5). When the carrier 11 has completed its movement through the angle 85, the end convolutions of the coil springs 7 abut the edge faces in the windows 45, 46 of the walls 9, 10(this holds true for the foremost and rearmost convolutions of the coil springs 7); therefore, the coil springs 7 do not dissipate energy when the carrier 11 continues to turn in the direction of arrow 43 beyond the angle 85. The coil springs 6 and 23 continue to dissipate energy while the carrier 11 covers the angle 86 on its way back to the neutral position of FIG. 1. When the carrier 11 completes the angle 85+86, both end convolutions of each coil spring 6 abut the respective edge faces in the windows 36, 37 of the walls 9 and 10. Moreover, the edge faces 81 in the windows 39 of the input element 16 then reach the respective end convolutions of the coil springs 6. The edge faces 81 in the windows 39 move ahead of the edge faces 81 in the windows 38 of the carrier 11 through an angle 75, i.e., through an angle corresponding to the extent of aforediscussed angular movement of the carrier 11 relative to the input element 16 while the carrier 11 was being turned in the direction of arrow 41 from the neutral position of FIG. 1 toward the end position denoted by the line 84.

The line 87 denotes in FIG. 5 that position of the carrier 11 with reference to the output element 2 of the clutch plate 1 which the parts 11 and 2 would assume when the friction clutch is engaged and the carrier 11 has slipped relative to the input element 16 through the angle 75 while the clutch plate 1 is not in the process of transmitting torque.

When the carrier 11 advances (in the direction of arrow 43) beyond the position which is indicated by the line 87 of FIG. 5, the springs 6 are caused to store energy because they abut the stationary walls 9, 10 on the one hand and are acted upon by the edge faces 81 of the input element 16 which turns in the direction of arrow 43. Such compression of the coil springs 6 takes place while the carrier 11 completes the angle 88, i.e., while the carrier 11 moves beyond the position indicated at 98 and toward the position at a maximum distance from the neutral position (as seen in the direction of arrow 43). The coil springs 6 then cease to store energy because the moment of friction between the friction pads 29 on the arms 28 and the friction linings 4, 5 (while the friction clutch is engaged) is greater than the maximum torque which the stressed coil springs 6 can transmit to the input element 16.

The angle 83 denotes in FIG. 5 that angular distance which is covered by the carrier 11 in the direction of arrow 43 when the edge faces 82 of the carrier 11 engage the adjacent convolutions of the coil springs 7 so that, as the carrier 11 continues to turn in the direction of arrow 43, the coil springs 7 are compressed in parallel with the coil springs 6 as a result of angular displacement of the carrier 11 with reference to the walls 9 and 10 of the output element 2 of the clutch plate 1.

As long as the friction clutch which includes the clutch plate 1 remains engaged, the characteristic torsional vibration damping curve of the springs which are active between the carrier 11 and the output element 2 of the clutch plate corresponds to that which is indicated in FIG. 5 by broken lines. When the friction clutch is disengaged, the friction linings 4, 5 become disengaged from the adjacent friction surfaces 68 and 67 and are moved axially of the clutch plate 11 and away from each other by the axially elastic segments 12 on the carrier 11. This results in a reduction of the moment of friction between the pads 29 on the arms 28 of the input element 16 and the friction linings 4, 5. Consequently, the coil springs 6, 7, 23 and 33 are free to return the carrier 11, the input element 16 of the primary damper 17 and the output element 2 of the clutch plate 1 back to the starting or neutral positions of FIG. 1. The characteristic damping curve between the output element 2 and the carrier 11 assumes the form which is shown in FIG. 5 by solid lines as soon as the friction clutch is reengaged by way of the diaphragm spring 63.

The diagram of FIG. 5 shows that, if the friction clutch is first engaged and thereupon disengaged while the engine of the vehicle is on and the variable-speed transmission whose input element carries the hub 8 is in neutral (i.e., when the clutch plate 1 does not transmit a pronounced torque to the variable-speed transmission), the primary or idling damper 17 is effective within the entire range of the corresponding angular displacement of the carrier 11, namely through the entire angle 40 in the traction direction 41 and through the entire angle 42 in the coasting direction 43. Consequently, the improved clutch plate 1 can damp vibrations which develop while the engine is idling and the clutch is engaged, i.e., such vibrations cannot be transmitted to the variable-speed transmission while the transmission is in neutral position. The angle within which only the coil springs 23 of the primary damper 17 store energy is reduced only when the carrier 11 has completed an angle 49+73 in the traction direction 41. The coil springs 23 cannot act alone when the angular displacement of the carrier 11 in the direction 41 reaches or exceeds 49+73+75. At such time, the characteristic torsional vibration damping curve is that which is indicated by broken lines within the angle 77 in the leftmost portion of FIG. 5. This holds true irrespective of the direction of angular movement of the carrier 11 and output element 2 relative to each other.

FIG. 5 also shows that, in view of the aforediscussed angular movement of the carrier 11 and input element 16 relative to each other within the angle 75, the range of effectiveness of the coil springs 6 is broadened so that the coil springs 6 are effective also within the angles 40 and 42 (subsequent to angular movement of the carrier 11 and input element 16 relative to each other), i.e., the coil springs 6 are active in addition to the coil springs 23 of the primary damper 17. Thus, it is possible to bypass the primary damper 17 when the vehicle is in motion and the friction clutch is engaged.

The diagram of FIG. 5 does not consider frictional hysteresis which is generated by the friction generating means including the parts 55, 57, 59, 60, 61 and 62. Such hysteresis is superimposed (within the angles when it is a factor) upon the characteristic damping curves which are shown in FIG. 5.

An important advantage of the improved clutch plate 1 is that the primary damper 17 is operative by itself (i.e., without the main damper including the coil springs 6 and 7) when the clutch is disengaged and is thereupon reengaged. In other words, each engagement or closing of the friction clutch entails an activation of the primary damper 17 without the main damper which latter is activated when the clutch plate 1 (in engaged condition of the friction clutch) is called upon to transmit a torque exceeding the maximum torque that can be transmitted by the primary damper 17. The centrifugal force is not a deciding factor so that the timing of activation and deactivation of the primary and/or main damper can be selected with a very high degree of accuracy. The primary damper 17 can be bypassed in several ways as soon as the idling RPM is exceeded. For example, and as already explained above, at least some coil springs of the main damper can be caused to operate in parallel with the coil springs 23 of the primary damper 17. The spring characteristics of the coil springs 6, 7 are higher than those of the coil springs 23. It is also possible to at least partially block the primary damper 17 (within the angle 75) so that angular displacement of the carrier 11 and hub 8 during such portion of the additional state (71+73+75+77) of angular displacement of the carrier 11 and hub 8 relative to each other involves compression of the springs 6 and/or 7 but not necessarily a compression of the springs 23.

The arrangement may be such that the aforediscussed conditions prevail only when the carrier 11 and the hub 8 rotate relative to each other in one of the two directions, particularly in the direction of arrow 41 (i.e., when the engine transmits torque to the wheels of a motor vehicle in response to engagement of the friction clutch and in response activation of the variable-speed transmission between the hub 8 and the wheels). As explained above, the arrangement is preferably such that the primary damper 17 is deactivated or bypassed if the flywheel 65 first rotates in the direction of arrow 41 (while the friction clutch is engaged) and is thereupon caused to change the direction of rotation to that which is indicated by the arrow 43. The primary damper 17 is reactivated when the clutch is thereupon disengaged or opened so that the parts of the clutch plate 1 can reassume their neutral positions.

An advantage of the additional coil spring or springs 33 (operating between the carrier 11 and the input element 16) is that such coil springs can move the carrier 11 and the input element 16 to predetermined angular positions relative to each other in automatic response to disengagement of the friction clutch.

By properly selecting the material and characteristics of the friction pads 29 for the arms 28 of the input element 16, the maker of the improved clutch plate 1 can select the moment of friction or slip torque between the friction pads 29 and the friction linings 4, 5.

The coefficient of friction between the friction pads 29 on the one hand and the friction linings 4, 5 on the other hand is preferably smaller than the coefficient of friction between the friction pads 4, 5 on the one hand and the friction surfaces 68, 67 of the flywheel 65 and pressure plate 66 on the other hand. This ensures, in a very simple but reliable way, that the moment of friction or slip torque between the input element 16 of the primary damper 17 and the carrier 11 of friction linings 4, 5 is smaller than the torque which can be transmitted between the flywheel 65 and pressure plate 66 (in engaged condition of the friction clutch) on the one hand, and the clutch plate 1 on the other hand.

When the friction clutch is engaged, the moment of friction between the input element 16 of the primary damper 17 and the friction linings 4, 5 is preferably greater than the maximum moment of resistance of the primary damper 17. This ensures that the input element 16 can turn relative to the carrier 11 (and/or vice versa) in engaged condition of the friction clutch only when the maximum moment of resistance of the primary damper 17 is exceeded. Such circumstances preferably prevail irrespective of the exact design of the primary damper 17 which can constitute a single-stage or a multi-stage damper. If the primary damper 17 comprises several stages, the maximum moment of resistance of the highest stage of the primary damper is less than the moment of friction between the input element of such multistage primary damper and the friction linings 4, 5 on the carrier 11.

In the illustrated embodiment of the clutch plate 1 wherein the primary damper 17 is a single-stage damper and the main damper has several stages including a first stage with coil springs 6 and a second stage with coil springs 7, slip torque between the input element 16 of the primary damper 17 (in engaged condition of the friction clutch) and the friction linings 4, 5 is or can be greater than the maximum moment of resistance of the first or lowest stage (coil springs 6) of the main damper. Consequently, slip torque between the input element 16 of the primary damper 17 and the friction linings 4, 5 on the carrier 11 is between the starting or minimal and the maximum moment of resistance of the second or higher stage (coil springs 7) of the main damper.

As explained above and as shown in FIG. 5, it is presently preferred to design the clutch plate 1 in such a way that the coil springs 23 of the primary damper 17 operate in parallel with the coil springs 7 of the main damper when the angular displacement of the carrier 11 and hub 8 relative to each other (in the direction of arrow 41) exceeds the angle 49+73+75 (i.e., within the angle 77), i.e., when the magnitude of transmitted torque exceeds slip torque between the input element 16 of the primary damper 17 and the friction linings 4, 5 on the carrier 11. However, it is equally within the purview of the invention to have the coil springs 7 of the main damper operate in series with the coil springs 23 of the primary damper 17 when the angular displacement of the carrier 11 and hub 8 relative to each other exceeds the angle 49+73+75, i.e., after the friction linings 4, 5 on the carrier 11 (which rotates with the flywheel 65 and pressure plate 66 when the friction clutch is engaged) have been caused to slip relative to the input element 16 within the angle 75.

As also explained above, the primary damper 17 can be bypassed or rendered ineffective (at least in part) by the simple expedient of causing the coil springs 6 or 7 (preferably the coil springs 6) to store energy during the additional stage 71+73+75+77 within a smaller angle prior, and within a larger angle subsequent, to slippage (angle 75) of the input element 16 of the primary damper 17 relative to the friction linings 4, 5 on the carrier 11 of the clutch plate 1 (as compared with the range of the coil springs 6 when the friction clutch is disengaged or when the extent of angular displacement of the carrier 11 relative to the hub 8 from the neutral position of FIG. 1 is less than 49+73).

The coil springs 6 in the windows 39 of the input element 16 and in the windows 38 of the carrier 11 store energy when the carrier 11 and its friction linings 4, 5 slip relative to the arms 28 and friction pads 29 of the input element 16. The positions of the radially extending edge faces 76 and 72 in the windows 47 and 48 are selected in such a way that the input element 16 begins to stress the coil springs 7 ahead of the carrier 11. This renders it possible to ensure, by the simple expedient of properly selecting the dimensions of the energy storing means (6, 7) of the main damper, that the moment of resistance which the energy storing means of the main damper exert is greater or becomes greater than the friction or slip torque between the input element 16 of the primary damper 17 and the friction linings 4, 5 on the carrier 11 so that, when the edge faces of the input element 16 engage the coil springs 7, the carrier 11 can turn relative to the input element 16. It has been found that the operation of the clutch plate 1 is particularly satisfactory if the slip torque between the input element 16 of the primary damper 17 and the carrier 11 is between the initial moment of resistance of the coil springs 6 and the maximum moment of resistance of such coil springs.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I CLAIM:

1. A component of a power train in a motor vehicle, such as a clutch plate with damper means, which is to be installed in an aggregate, such as an engageable and disengageable friction clutch, comprising a hub; a carrier of friction linings, said hub and said carrier being rotatable relative to each other in at least one direction from a neutral position; and at least two dampers operative to oppose rotation of said hub and said carrier relative to each other in said at least one direction, said dampers comprising a primary damper which is originally the only damper of said at least two dampers to yieldably oppose with a first torque a first stage of rotation of said hub and said carrier relative to each other in said direction from said neutral position and is arranged to generate, upon completion of said first stage, a maximum moment of resistance to rotation of said hub and said carrier relative to each other in said at least one direction, the damping characteristic of said component varying at least within said first stage exclusively as a function of engagement of the friction clutch and as a function of transmission of torque exceeding said maximum moment of resistance, the original damping characteristic of the component being restored, at least within the first stage, only in response to disengagement of the clutch until the maximum moment of resistance is exceeded subsequent to reengagement of the clutch.

2. The component of claim 1, wherein said primary damper includes energy storing means and an input element having portions disposed between said friction linings, said portions of said input element of said primary damper being clamped between said friction linings in engaged condition of the friction clutch, said input element and said hub being angularly movable relative to each other against the opposition of said energy storing means.

3. The component of claim 1, wherein said primary damper includes first energy storing means and an input element which is rotatable relative to said carrier, and further comprising additional energy storing means arranged to oppose rotation of said carrier and said input element relative to each other.

4. The component of claim 3, wherein said first energy storing means is nearer to said hub that said additional energy storing means.

5. The component of claim 3, wherein said additional energy storing means is operative to maintain said carrier and said input element in a predetermined position relative to each other in disengaged condition of the friction clutch.

6. The component of claim 1, wherein said primary damper comprises a substantially disc-shaped input element having radially outwardly extending arms disposed between said friction linings and being clamped between said friction linings in the engaged condition of the friction clutch.

7. The component of claim 6, wherein said arms are provided with friction pads adjacent said friction linings.

8. The component of claim 6, wherein the friction clutch has friction surfaces in frictional engagement with said friction linings in engaged condition of the friction clutch, the coefficient of friction between said arms and said friction linings being smaller than the coefficient of friction between said friction linings and said friction surfaces.

9. The component of claim 1, wherein said primary damper further includes an input element which is clamped between said friction linings in engaged condition of the friction clutch, the moment of friction between said input element and said friction linings in engaged condition of the friction clutch being greater than said maximum moment of resistance.

10. The component of claim 1, wherein said at least two dampers further comprise a main damper which includes a plurality of energy storing means including energy storing means which stores energy when said first stage of rotation is completed, said primary damper comprising an input element which is clamped between said friction linings in engaged condition of the friction clutch, the moment of friction between said input element and said friction linings in engaged condition of the friction clutch being greater than the maximum moment of resistance of said energy storing means.

11. The component of claim 1, wherein said primary damper comprises first energy storing means and an input element which is clamped between said friction linings in response to engagement of the friction clutch and is arranged to slip relative to said friction linings during an advanced portion of an additional stage of rotation of said hub and said carrier relative to each other, said at least two dampers further comprising a main damper having first and second additional energy storing means, said first additional energy storing means being arranged to store energy at least during the initial portion of said additional stage and said second additional energy storing means being arranged to operate in parallel with said first energy storing means and to store energy during a portion of said additional stage following said advanced portion.

12. The component of claim 1, wherein said primary damper comprises first energy storing means and an input element which is clamped between said friction linings in engaged condition of the friction clutch and slips relative to said friction linings during a second portion of an additional stage of rotation of said carrier and said hub relative to each other following a first portion and preceding a third portion of the additional stage, said at least two dampers further further including a main damper having additional energy storing means including at least one energy storing element which stores energy during said additional stage within a smaller angle prior to, and within a larger angle subsequent, to slippage of said input element relative to said friction linings.

13. The component of claim 1, wherein said primary damper comprises first energy storing means and an input element which is clamped between said friction linings in engaged condition of the friction clutch and slips relative to said carrier within a predetermined portion of an additional stage of rotation of said carrier and said hub relative to each other, said input element and said carrier having windows and said at least two dampers further comprising a main damper having additional energy storing means comprising at least one energy storing element which is disposed in said windows and is arranged to store energy as a result of relative angular movement of said input element and said carrier within said predetermined portion of said additional stage.

14. The component of claim 13, wherein said additional energy storing means further comprises at least one further energy storing element which stores energy as a result of angular movement of said input element and said carrier relative to each other in response to engagement of said input element with said further energy storing element prior to engagement of said further energy storing element with said carrier.

15. The component of claim 1, wherein said primary damper comprises first energy storing means and an input element which is clamped between said friction linings in engaged condition of the friction clutch, said at least two dampers further comprising a main damper having additional energy storing means including at least one energy storing element whose moment of resistance is between a minimum and a maximum value within a predetermined portion of an additional stage of rotation of said hub and said carrier relative to each other, said input element being arranged to slip relative to said carrier within said predetermined portion of the additional stage.

16. The component of claim 1, wherein said at least two dampers further comprise a main damper and further comprising a wall connected with said hub and constituting with said hub a portion at least of the output means of said main damper, said primary damper comprising first energy storing means and an input element which is clamped between said friction linings in engaged condition of the friction clutch, said main damper having additional energy storing means and said wall and said input element having windows for said first energy storing means, said wall and said carrier and said input element having windows for said additional energy storing means.

17. The component of claim 16, wherein said additional energy storing means includes two groups of energy storing elements in the windows of said carrier, said input element and said wall.

18. The component of claim 16, further comprising a second wall connected with said hub, said walls being spaced apart from each other in the axial direction of said hub and said input element and said carrier being disposed between said walls.

19. The component of claim 18, further comprising a disc-shaped member affixed to said hub between said walls.

20. The component of claim 19, wherein said carrier and said input element have radially innermost portions adjacent said hub and flanking said disc-shaped member.

21. The component of claim 16, wherein said disc-shaped member has at least one window for said first energy storing means.

22. The component of claim 1, further comprising two walls affixed to said hub and being spaced apart from each other in the axial direction of said hub, said primary damper comprising first energy storing means and an input element which is clamped between said friction linings in engaged condition of the friction clutch, said at least two dampers further comprising a main damper having additional energy storing means and said input element and said carrier having first windows for said additional energy storing means, said walls having second windows for said additional energy storing means, said input element and said carrier having first substantially radially extending edge faces in the respective first windows and said walls having second substantially radially extending edge faces in the respective second windows, all of said first edge faces being offset with reference to all of said second edge faces in the circumferential direction of said hub in disengaged condition of the friction clutch.

23. The component of claim 1, wherein said primary damper comprises first energy storing means and an input element which is clamped between said friction linings in engaged condition of the friction clutch, said input element and said carrier each having at least one window for said first energy storing means, the window of said input element registering with and having the same length in the circumferential direction of said hub as the window of said carrier.

24. The component of claim 1, wherein said primary damper comprises first energy storing means and an input element which is clamped between said friction linings in engaged condition of the friction clutch, said at least two dampers further comprising a main damper having additional energy storing means, said carrier and said input element each having at least one window for said additional energy storing means, the window of said carrier registering with and having the same length in the circumferential direction of said hub as the window of said input element.

25. The component of claim 1, wherein said primary damper comprises first energy storing means and an input element which is clamped between said friction linings in engaged condition of the friction clutch, said at least two dampers further comprising a main damper having additional energy storing means and said input element and said carrier having first windows for said additional energy storing means, and further comprising two walls affixed to said hub and being spaced apart from each other in the axial direction of the hub, said walls having second windows for said additional energy storing means, said second windows registering with and being shorter than said first windows in the circumferential direction of said hub.

26. The component of claim 1, wherein said primary damper comprises first energy storing means and an input element which is clamped between said friction linings in engaged condition of the friction clutch, said at least two dampers further comprising a main damper having additional energy storing means and said input element and said carrier having windows for said additional energy storing means, said carrier and said input element further having substantially radially extending edge faces provided in the respective windows and being aligned with each other in the axial direction of said hub in disengaged condition of the friction clutch.

27. The component of claim 1, wherein said at least one direction is the traction direction and further comprising means for preventing said primary damper from constituting the only one of said at least two dampers to oppose rotation of said carrier and said hub relative to each other in said traction direction.

28. The component of claim 1, wherein the engagement of the clutch and the transmission of a predetermined torque exceeding said maximum moment of resistance prevent said primary damper from acting alone within the maximum permissible range of rotation of said hub and said carrier relative to each other, disengagement of the clutch enabling said primary damper to constitute the only one of said at least two dampers to oppose rotation of said hub and said carrier relative to each other beyond said first stage.

* * * * *